United States Patent
Nayak et al.

(10) Patent No.: US 11,516,717 B2
(45) Date of Patent: Nov. 29, 2022

(54) LOW POWER OUT OF SERVICE RECOVERY OF MOBILE COMPUTING DEVICES

(71) Applicant: GOOGLE LLC, Mountain View, CA (US)

(72) Inventors: Shivank Nayak, Milpitas, CA (US); Siddharth Ray, Sunnyvale, CA (US); Junda Liu, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/252,935

(22) PCT Filed: Jun. 21, 2018

(86) PCT No.: PCT/US2018/038736
§ 371 (c)(1),
(2) Date: Dec. 16, 2020

(87) PCT Pub. No.: WO2019/245562
PCT Pub. Date: Dec. 26, 2019

(65) Prior Publication Data
US 2021/0153089 A1 May 20, 2021

(51) Int. Cl.
*H04W 36/08* (2009.01)
*H04W 36/32* (2009.01)
(Continued)

(52) U.S. Cl.
CPC .......... *H04W 36/08* (2013.01); *H04W 36/32* (2013.01); *H04W 48/16* (2013.01); *H04W 52/0261* (2013.01)

(58) Field of Classification Search
CPC ..... H04W 36/08; H04W 36/32; H04W 48/16; H04W 52/0261; H04W 52/02; Y02D 30/70
(Continued)

(56) References Cited

U.S. PATENT DOCUMENTS 9,380,557 B2   6/2016   Cili et al.
9,854,510 B2   12/2017   Pasupuleti et al.
(Continued)

FOREIGN PATENT DOCUMENTS

WO   2017/039956 A1   3/2017
WO   2017039956 A1    3/2017

OTHER PUBLICATIONS

International Search Report and Written Opinion dated Sep. 25, 2018 for corresponding International Application No. PCT/US2018/038736, 12 pages.
(Continued)

*Primary Examiner* — Michael Y Mapa

(57) ABSTRACT

Apparatus and methods related to acquiring service on mobile computing devices (MCDs) are provided. An MCD can determine whether the MCD is connected to a wireless network. After determining that the MCD is not connected to the wireless network, the MCD can determine a scanning context that includes a mobility attribute and/or a location attribute. Based on the scanning context, the MCD can determine frequencies associated with the wireless network and scanning rates for scanning the frequencies, where each frequency can be associated with a respective scanning rate. The MCD can scan one or more of the frequencies at one or more respective scanning rates for a signal that enables the MCD to attempt connection with the wireless network.

23 Claims, 7 Drawing Sheets

(51) Int. Cl.
*H04W 48/16* (2009.01)
*H04W 52/02* (2009.01)

(58) Field of Classification Search
USPC ............... 370/331; 455/404.2, 414.1–414.2, 455/434–435.3, 456.1–456.7
See application file for complete search history.

(56) References Cited

U.S. PATENT DOCUMENTS

| | | |
|---|---|---|
| 2007/0129092 A1 | 6/2007 | Doradla et al. |
| 2009/0209278 A1* | 8/2009 | Narang ................. H04W 48/16 455/522 |
| 2009/0270091 A1 | 10/2009 | Joshi et al. |
| 2013/0040640 A1 | 2/2013 | Chen et al. |
| 2013/0090117 A1 | 4/2013 | Ngai et al. |
| 2014/0073302 A1* | 3/2014 | Trethewey ............ G06F 1/3215 455/418 |
| 2014/0194086 A1 | 7/2014 | Alam et al. |
| 2017/0164291 A1* | 6/2017 | Ludwig ............. H04W 52/0245 |
| 2017/0332313 A1* | 11/2017 | Li ........................ H04W 48/18 |
| 2017/0339627 A1 | 11/2017 | Achamola et al. |
| 2017/0374500 A1* | 12/2017 | Guy ....................... H04W 4/02 |

OTHER PUBLICATIONS

Office Action dated Dec. 20, 2021 for Indian Patent Application No. 202047054261, 7 pages.
English Translation of German Examination Report dated Mar. 18, 2022 for corresponding DE Application No. 11 2018 007 750.0, 7 pages.

* cited by examiner

| Scanning Context 300 | | |
|---|---|---|
| Attributes 310 | Example Attribute Values 312 | Attribute's Effect on Scanning Profile 314 |
| Mobility | Static, walking, driving | Increase scanning rate as mobility increases |
| Battery | Battery life % | Increase scanning rate as battery life increases |
| Screen activity | Active, inactive | If screen is active, increase scanning rate |
| Thermal | Device temperature in °C (or °F) | Decrease scanning rate as thermal attribute increases |
| Software app | Number of active applications | If one or more applications active, increase scanning rate |
| MRU frequency | MRU frequency value(s) | Select most recently used (MRU) frequency first and/or Change MRU frequency's scan rate |
| Predicted location | Lat./long. of predicted location(s) | Select frequencies based on predicted MCD location |
| Actual location | Lat./long. of actual location | Select frequencies based on actual MCD location |

FIG. 3

700

710 Determine whether a mobile computing device is connected to a particular wireless network

720 Responsive to determining that the mobile computing device is not connected to the particular wireless network:
- Determine, by the mobile computing device, a scanning context that includes a plurality of attributes associated with the mobile computing device, the plurality of attributes including a mobility attribute,
- Determine a set of frequencies associated with the particular wireless network and a set of scanning rates for scanning the set of frequencies associated with particular wireless network based on the scanning context, where each frequency in the set of frequencies is associated with a respective scanning rate in the set of scanning rates, and
- Scan one or more frequencies in the set of frequencies at one or more associated scanning rates in the set of scanning rates for a signal that enables the mobile computing device to attempt connecting with the particular wireless network

FIG. 7

LOW POWER OUT OF SERVICE RECOVERY OF MOBILE COMPUTING DEVICES

CROSS-REFERENCE TO RELATED APPLICATIONS

The present application is a U.S. National Stage under 35 U.S.C. § 371 of International Patent Application Serial No. PCT/US2018/038736, entitled "LOW POWER OUT OF SERVICE RECOVERY OF MOBILE COMPUTING DEVICES" and filed on Jun. 21, 2020, the entirety of which is incorporated by reference herein.

BACKGROUND

Many mobile computing devices, including smart phones, can connect to wireless networks to provide data and/or voice services. At some times, though, such mobile computing devices can go "out of service"; that is, become disconnected from some or all previously-connected wireless networks. When mobile computing device goes out of service, the mobile computing device can attempt to reconnect to some or all of the previously-connected wireless networks. If the mobile computing device is successful, the mobile computing device can go "in service" by reconnecting to one or more of the previously-connected wireless networks to provide data and/or voice services.

SUMMARY

In one aspect, a computer-implemented method is provided. A mobile computing device determines whether the mobile computing device is connected to a particular wireless network. Responsive to determining that the mobile computing device is not connected to the particular wireless network, the mobile computing device determines a scanning context that comprises at least one attribute associated with the mobile computing device, the at least one attribute comprising a mobility attribute. A set of frequencies associated with the particular wireless network and a set of scanning rates for scanning the set of frequencies based on the scanning context is determined, wherein each frequency in the set of frequencies is associated with a respective scanning rate in the set of scanning rates. One or more frequencies in the set of frequencies at one or more associated scanning rates in the set of scanning rates are scanned for a signal that enables the mobile computing device to attempt connection with the particular wireless network.

In another aspect, a mobile computing device is provided. The mobile computing device includes one or more processors and one or more computer readable media. The one or more computer readable media have computer-executable instructions stored thereon that, when executed by the one or more processors, cause the mobile computing device to perform functions. The functions include: determining whether the mobile computing device is connected to a particular wireless network; and, responsive to determining that the mobile computing device is not connected to the particular wireless network: determining a scanning context that comprises at least one attribute associated with the mobile computing device, the at least one attribute comprising a mobility attribute; determining a set of frequencies associated with the particular wireless network and a set of scanning rates for scanning the set of frequencies based on the scanning context, wherein each frequency in the set of frequencies is associated with a respective scanning rate in the set of scanning rates; and scanning one or more frequencies in the set of frequencies at one or more associated scanning rates in the set of scanning rates for a signal that enables the mobile computing device to attempt connection with the particular wireless network.

In another aspect, a mobile computing device is provided. The mobile computing device includes: means for determining whether the mobile computing device is connected to a particular wireless network; and, means for, responsive to determining that the mobile computing device is not connected to the particular wireless network: determining a scanning context that comprises at least one attribute associated with the mobile computing device, the at least one attribute comprising a mobility attribute; determining a set of frequencies associated with the particular wireless network and a set of scanning rates for scanning the set of frequencies based on the scanning context, wherein each frequency in the set of frequencies is associated with a respective scanning rate in the set of scanning rates; and scanning one or more frequencies in the set of frequencies at one or more associated scanning rates in the set of scanning rates for a signal that enables the mobile computing device to attempt connection with the particular wireless network.

In another aspect, an article of manufacture is provided. The article of manufacture includes one or more computer readable media. The one or more computer readable media have computer-executable instructions stored thereon that, when executed by one or more processors of a mobile computing device, cause the mobile computing device to perform functions. The functions include: determining whether the mobile computing device is connected to a particular wireless network; and, responsive to determining that the mobile computing device is not connected to the particular wireless network: determining a scanning context that comprises at least one attribute associated with the mobile computing device, the at least one attribute comprising a mobility attribute; determining a set of frequencies associated with the particular wireless network and a set of scanning rates for scanning the set of frequencies based on the scanning context, wherein each frequency in the set of frequencies is associated with a respective scanning rate in the set of scanning rates; and scanning one or more frequencies in the set of frequencies at one or more associated scanning rates in the set of scanning rates for a signal that enables the mobile computing device to attempt connection with the particular wireless network.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 3 depicts an example scanning context for connecting a mobile computing device with one or more networks, in accordance with example embodiments.

FIG. 7 is a flowchart of a method, in accordance with example embodiments.

DETAILED DESCRIPTION

Figure 1:
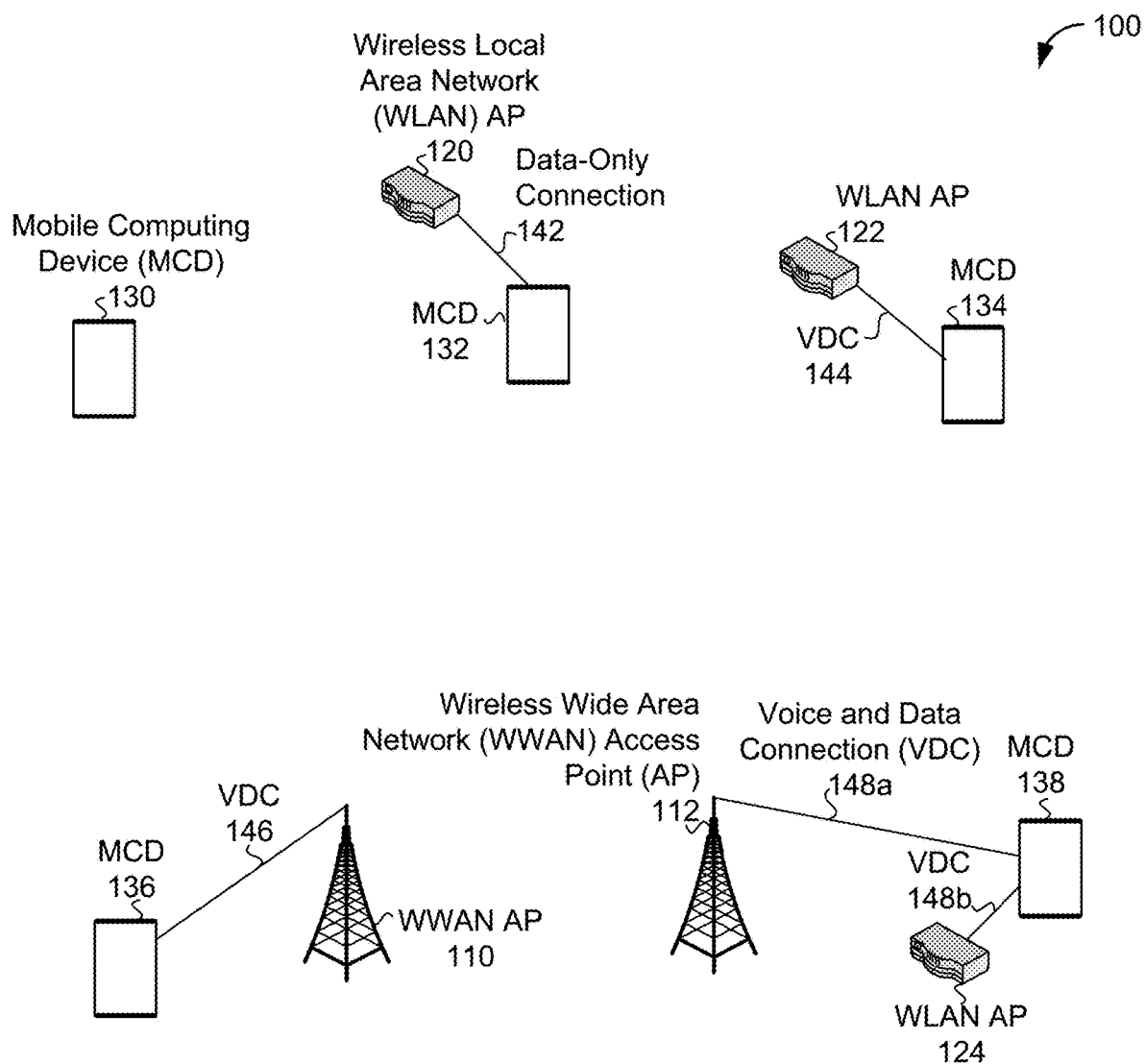
FIG. 1 is a diagram showing connections between mobile computing devices (MCDs) and access points (APs) for wireless networks, in accordance with example embodiments.

Methods and Apparatus for Low Power Out of Service Recovery of Mobile Computing Devices Mobile computing devices, such as smartphones or tablets, are frequently connected to one or more wireless networks to provide services, such as data and/or voice services. If a mobile computing device is currently not connected to a wireless network, then that mobile computing device can be called "out of service". In some cases, a mobile computing device can be connected to a network but a particular service, such as voice service or data service, is unavailable—in that case, the mobile computing device can still be classified as out of service with respect to the particular service.

If battery life was not a concern, an out of service mobile computing device could continuously scan one or more frequencies for network access. For example, the mobile computing device may perform a scan of a particular frequency by attempting to connect to a particular network using the particular frequency. If the scan is successful, the mobile computing device can "acquire service" or obtain access to one or more services from the particular network.

However, typical mobile computing devices have limited amounts of battery power. Further, a typical mobile computing device uses a significant amount of power when scanning "for service"; that is, when scanning one or more frequencies to connect to one or more wireless networks. In some examples, mobile computing devices use 8 to 10 times more power while scanning for service than when idle.

Some out of service scan algorithms balance time when a device is not scanning for service and time when the device is scanning, so as to have sufficient performance on service recovery and power consumption. For example, an incremental sleep algorithm could be used in which a mobile computing device scans for service less frequently as out of service time increases. Also, the mobile computing device could scan a most recently connected frequency when attempting to connect to a particular network for service. In practice, a tradeoff exists between power consumption in scanning for service and delay in service acquisition.

Described herein are out of service recovery algorithms that enable a mobile computing device to intelligently use sensor data to control service acquisition (or reacquisition) with high power efficiency and with little or no negative effect on user experience. For example, sensor data, such as mobility-related data, battery-related data, screen status data, and thermal status data, can be used as described herein to determine a scanning context for the mobile computing device, where the scanning context includes a number of data-driven attributes. For example, the mobility-related data, battery-related data, screen status data, and thermal status data can be used to determine respective mobility, battery, screen activity, and thermal attributes of the scanning context.

The use of mobility-related data, as described herein, can provide advantages over other approaches that assume that a mobile computing device is always mobile, and so has a rapidly changing radio frequency (RF) environment. Under the rapidly changing RF environment assumption, an out of service recovery algorithm may scan for service frequently, which can lead to increased power usage to perform these scans. However, the herein-described out of service recovery algorithm(s) can obtain sensor information, such as location data from location sensors, network connectivity data from network interfaces, and/or motion data from accelerometers, to determine a mobility attribute. The herein-described out of service recovery algorithm(s) can increase (or decrease) scanning rates as the mobility attribute indicates that the mobile computing device increases (or decreases) mobility.

Regarding battery-related data, the herein-described out of service recovery algorithm(s) can obtain sensor information, such as battery life data from a battery sensor, to determine a battery attribute of the scanning context. The herein-described out of service recovery algorithm(s) can increase (or decrease) scanning rates as the battery attribute indicates that the mobile computing device has more (or less) battery power available. If the battery attribute indicates that battery power is critically low (e.g., less than a pre-determined amount of battery life, such as 5%, 10%, or 120%), the herein-described out of service recovery algorithm(s) can be tuned to try to save as much battery power as possible by reducing scanning rates.

Regarding screen status data, the herein-described out of service recovery algorithm(s) are based on an insight that a user of the mobile computing device can have a perception that being in service is more important when the user is looking at information provided by the mobile computing device; that is, when a screen (such as a touch screen) associated with of the mobile computing device is active. A screen associated with the mobile computing device can be a visual entity that is physically attached to the mobile computing device and/or that is communicatively coupled to the mobile computing device (e.g., via wired and/or wireless connections) which may provide information from the mobile computing device at least visually to a user or other entity. Examples screens that can be associated with the mobile computing device include, but are not limited to, one or more: touch screens, internal displays, external displays, displays associated with a vehicle such as a dashboard display, smartwatch displays, head-mounted displays televisions, and/or virtual reality devices. Thus, information about screen status can be used to decide when to initiate scanning and/or in determining scanning rates. For example, a scan of frequencies in the set of frequencies to acquire service can be triggered when screen-related data indicates that that the screen has been turned on and/or a set of scanning rates associated with the set of frequencies can be increased when screen-related data indicates that that the screen has been turned on.

The herein-described out of service recovery algorithm(s) can obtain sensor information, such as screen activation status data from a sensor associated with the screen (or in some cases, directly from the screen), to determine a screen activity attribute of the scanning context. Then, the herein-described out of service recovery algorithm(s) can increase (or decrease) scanning rates as the screen activity attribute indicates that the screen of the mobile computing device is active (or inactive). Also, as mentioned above, a transition of the screen activity attribute from a state associated with an inactive screen to another states associated with active screen, can trigger a scan of frequencies to acquire service.

Regarding thermal status data, the herein-described out of service recovery algorithm(s) can obtain the thermal status data from one or more sensors. For example, device temperature information and/or environmental temperature information about an environment related to the mobile computing device can be obtained from one or more thermometers and/or other thermal sensors. The herein-described out of service recovery algorithm(s) can determine a thermal attribute based on the thermal status data. The herein-described out of service recovery algorithm(s) can decrease (or increase) scanning rates as the battery attribute indicates that the mobile computing device and/or the environment related to the mobile computing device is warmer (or colder). Other sensor-related data and/or attributes are possible as well, for example, as discussed herein.

In some examples, the attributes of the scanning context can be determined once the mobile computing device determines that it is out of service. In other examples, some or all of the attributes of the scanning context can be determined before the mobile computing device goes out of service.

If the mobile computing device goes out of service, the herein-described out of service recovery algorithm(s) can utilize the attributes of the scanning context to determine a scanning profile. The scanning profile can include a set of frequencies and a related set of scanning rates for scanning the set of frequencies to acquire service for the mobile computing device. More particularly, the herein-described out of service recovery algorithm(s) can look at sensor data, as indicated in the attributes of the scanning context, to intelligently adjust the set of frequencies and the related set of scanning rates of the scanning profile, e.g., so as to strike a balance between service acquisition time and power consumption. In some cases, the herein-described out of service recovery algorithm(s) can terminate once the mobile computing device acquires service.

The use of sensor data by the herein-described out of service recovery algorithm(s) to determine frequencies and scanning rates for acquiring service can reduce the power needed to acquire (or reacquire) service for the mobile computing device over conventional techniques. For example, in some scenarios, the herein-described out of service recovery algorithm(s) may reduce power consumption by 80% or more. By reducing power consumption, battery life of the mobile computing device can be extended and thereby increase availability of the mobile computing device for a user. Also, by considering user-facing attributes, such as the above-mentioned screen activity attribute, service acquisition can be attempted when a user is expecting to have service, thereby beneficially increasing user satisfaction with the herein-described out of service recovery algorithm(s). Further, by extending battery life, the herein-described out of service recovery algorithm(s) can make more attempts to acquire service before the battery of the mobile computing device is exhausted, thereby enabling the mobile computing device to increase the probability over time that service will be acquired. Thus, the herein-described out of service recovery algorithm(s) can beneficially extend battery life and can beneficially increase the probability of service acquisition of for out-of-service mobile computing device, thereby advantageously increasing user satisfaction with these mobile computing devices.

FIG. 1 is a diagram 100 showing connections between mobile computing devices and access points for wireless networks, in accordance with example embodiments. At upper left of FIG. 1, mobile computing device 130 is shown not being connected to any other devices. As such, mobile computing device 130 is shown as being out of service.

At upper center of FIG. 1, mobile computing device 132 is shown as having data only connection 142 with access point 120. In some examples, access point 120 could be part of a wireless local area network (WLAN). In such examples, mobile computing device 132 may utilize Wi-Fi and/or one or more similar protocols to establish a WLAN connection with WLAN access point 120 for data services. With such a connection, mobile computing device 132 is in service with respect to data services, but is out of service with respect to voice services.

At upper right of FIG. 1, mobile computing device 134 is shown as having voice and data connection (VDC) 144 with access point 122. In some examples, access point 122 could be part of a WLAN. In such examples, mobile computing device 134 may utilize Wi-Fi or a similar protocol to establish a WLAN connection with WLAN access point 122 for data and voice services (e.g., voice over Wi-Fi services). With such a connection, mobile computing device 134 is in service with respect to both data and voice services.

At lower left of FIG. 1, mobile computing device 136 is shown as having voice and data connection 146 with access point 110. In some examples, access point 110 could be part of a wireless wide area network (WWAN). In such examples, mobile computing device 136 may utilize a 2G ($2^{nd}$ Generation Wireless Systems), 3G ($3^{rd}$ Generation Wireless Systems), 4G ($4^{th}$ Generation Wireless Systems), 5G ($5^{th}$ Generation Wireless Systems), Global System for Mobile communication (GSM), Time Division Multiple Access (TDMA), Code Division Multiplexed Access (CDMA), and/or one or more similar protocols to establish a connection with WWAN access point 110 for data and voice services. With such a connection, mobile computing device 136 is in service with respect to both data and voice services. In other examples, mobile computing device 136 could have a voice-only connection with WWAN access point 110. With such a connection, mobile computing device 136 is in service with respect to voice services but is out of service with respect to data services.

At lower right of FIG. 1, mobile computing device 138 has two connections—voice and data connection 148a with WWAN access point 112 and voice and data connection 148b with WLAN access point 124. With these connections 148a and 148b, mobile computing device 136 is in service with respect to both data and voice via both a WWAN and a WLAN. In other examples, mobile computing device 136 can be in service with respect to one network but out of service with respect to another network. For example, WLAN access point 124 could provide data-only services to mobile computing device 138 such that mobile computing device 138 is out of service for voice services with the WLAN, and WWAN access point 112 could provide voice-only services to mobile computing device 138 such that mobile computing device 138 is out of service for data services with the WWAN. In related examples, a mobile computing device can be connected to multiple WLAN access points and/or multiple WWAN access points simultaneously.

In other examples, other services (e.g., video services, streaming data services, text services, and/or other content services) can be provided to a mobile computing device connected to one or more networks via one or more access points. In these other examples, the mobile computing device can be considered to be in service or out of service with respect to each of these other services, along with and/or instead of, data and voice services. For example, a mobile computing device could be in service with respect to a basic (e.g., narrow-band) data service, such as text messaging, but could be out of service with respect to a broadband data service, such as streaming data and/or video services. For purposes of illustration, only voice and data services are discussed in detail herein. However, one of skill in the art can readily apply the herein-described out of service algorithm(s) to services other than voice and data services.

Figure 2:
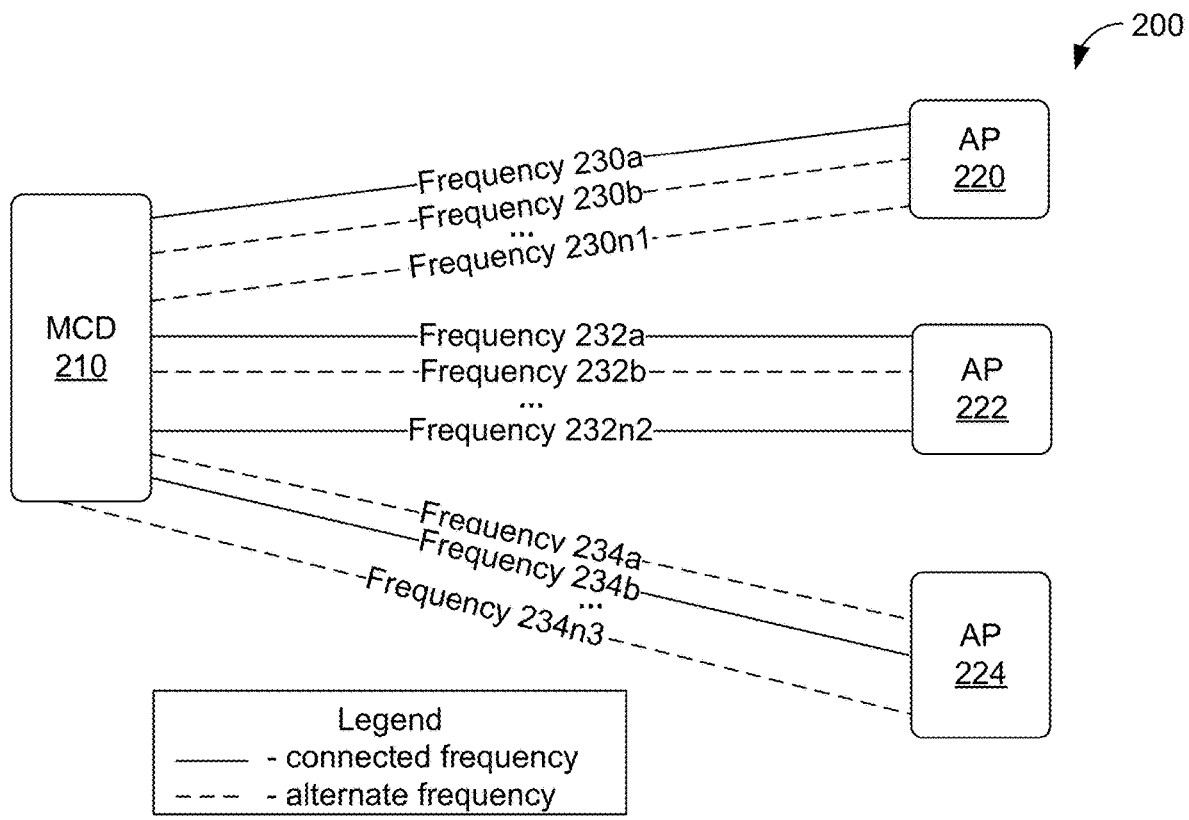
FIG. 2 illustrates connections between a mobile computing device and three access points, and a related scanning profile for the mobile computing device, in accordance with example embodiments.

FIG. 2 shows diagram 200, which illustrates connections between mobile computing device 210 and access points 220, 222, 224 and scanning profile 250 for the mobile computing device, in accordance with example embodiments. An upper portion of FIG. 2 illustrates connections between mobile computing device 210 and access points 220, 222, 224, where access points 220, 222, 224 can be used to connect mobile computing device 210 with one or more WLANs and/or one or more WWANs by way of one or more of the frequencies 230a, 230b, 230n1, 232a, 232b, 232n2, 234a, 234b, 234n3 and perhaps other frequencies.

Diagram 200 illustrates two different types of frequencies that can be used to connect mobile computing device 210 with an access point: a connected frequency used to connect to the access point; and an alternate frequency, which could be used to connect to the access point, but is not currently being used in a connection. As indicated by the legend of diagram 2, FIG. 2 illustrates connections between mobile computing device 210 and an access point using a connected frequency with solid lines and illustrates possible connections that could be made between mobile computing device 210 and an access point using an alternate frequency with dashed lines. Other types of connections and frequencies are possible as well.

Diagram 200 shows that mobile computing device 210 is connected to access point 220 using connected frequency 230a and that frequencies 230b . . . 230n1 are alternate frequencies that could be used to connect mobile computing device 210 to access point 220. In the example shown in diagram 200, there are n1 total possible frequencies that can possibly be used to connect mobile computing device 210 and access point 220—one actual frequency 230a used for a connection between mobile computing device 210 and access point 220 and (n1−1) alternate frequencies for possible connections between mobile computing device 210 and access point 220.

Diagram 200 also shows that mobile computing device 210 is connected to access point 222 using connected frequencies 232a and 232n2 and that at least frequency 232b is an alternate frequency that could be used to connect mobile computing device 210 to access point 222. In the example shown in diagram 200, there are n2 total possible frequencies that can possibly be used to connect mobile computing device 210 and access point 222—two actual frequencies 232a and 232n2 used for one or more connections between mobile computing device 210 and access point 222 and (n2−2) alternate frequencies for possible connections between mobile computing device 210 and access point 222.

Diagram 200 further shows that mobile computing device 210 is connected to access point 224 using connected frequency 234b and that at least frequencies 234a and 234n3 are alternate frequencies that could be used to connect mobile computing device 210 to access point 224. In the example shown in diagram 200, there are n3 total possible frequencies that can possibly be used to connect mobile computing device 210 and access point 220—one actual frequency 234b used for a connection between mobile computing device 210 and access point 224 and (n3−1) alternate frequencies for possible connections between mobile computing device 210 and access point 224. In other examples, mobile computing device 210 can connect to more, fewer, and/or different access points than shown in diagram 200 and/or can use more, fewer, and/or different frequencies to connect to access points than shown in diagram 200.

A lower portion of FIG. 2 shows scanning profile 250 for mobile computing device 210 for connecting with at least access points 220, 222, 224. Scanning profile 250 shows a set of frequencies 260 and a corresponding set of scanning rates 262. In other examples, more, fewer, and/or different data can be provided in scanning profile 250; e.g., different sets of frequencies and/or scanning rates, additional access point and/or other information.

A frequency in set of frequencies 260 could be used to connect mobile computing device 210 to an access point. The herein-described out of service recovery algorithm(s) can attempt to connect to the frequency in set of frequencies 260 at a corresponding scanning rate in set of scanning rates 262. For example, scanning profile 250 shows that "Freq 230a" (which is short for frequency 230a) can be used to connect mobile computing device 210 with access point 220 by scanning frequency 230a at a scanning rate of "Rate 1". Scanning profile 250 also shows that "Freq 230b" . . . "Freq 230n1"; that is, frequencies 230b . . . 230n1 can be used to connect mobile computing device 210 with access point 220 by scanning respective frequencies 230b . . . 230n1 at respective scanning rates of "Rate 2" . . . "Rate n1".

Scanning profile 250 also shows that "Freq 232a", "Freq 232b" . . . "Freq 232n2"; that is, frequencies 232a, 232b . . . 232n2 can be used to connect mobile computing device 210 with access point 222 by scanning respective frequencies 232a, 232b . . . 232n2 at respective scanning rates of "Rate n1+1", "Rate n1+2" . . . "Rate n1+n2". Additionally, scanning profile 250 shows that "Freq 234a", "Freq 234b" . . . "Freq 234n3"; that is, frequencies 234a, 234b . . . 234n3, can be used to connect mobile computing device 210 with access point 224 by scanning respective frequencies 234a, 234b . . . 234n3 at respective scanning rates of "Rate n1+n2+1", "Rate n1+n2+2" . . . "Rate n1+n2+n3".

The herein-described out of service recovery algorithm(s) can use the data in scanning profile 250 to attempt to connect mobile computing device 210 to a network and/or put mobile computing device 210 into service. For example, the herein-described out of service recovery algorithm(s) can start with data from the first row of scanning profile 250 and scan frequency 230a at a scanning rate of Rate 1. More particularly, if Rate 1 were twenty connection attempts per minute, then the herein-described out of service recovery algorithm(s) can attempt to connect mobile computing device 210 to access point 220 using frequency 230a twenty times per minute until either (a) mobile computing device 210 connects with access point 220 or (b) the herein-described out of service recovery algorithm(s) determines to stop scanning access point 220 using frequency 230a. If one of these scans is successful and mobile computing device 210 connects to access point 220 using frequency 230a to put mobile computing device 210 in service (at least with respect to service provided by access point 220), then the herein-described out of service recovery algorithm(s) can stop scanning on at least frequency 230a.

However, if the attempts to connect frequency 230a at Rate 1 were unsuccessful, then the herein-described out of service recovery algorithm(s) can stop scanning access point 220 using frequency 230a and select the next frequency in scanning profile 250 to attempt to return mobile computing device 210 to service.

For example, suppose that the herein-described out of service recovery algorithm(s) perform a predetermined number of scans and/or scans for a predetermined amount of time before determining to stop scanning an access point (or more generally, a network) using a particular frequency. Then, after the predetermined number of scans and/or predetermined amount of time elapses without connecting mobile computing device 210 to the access point, the herein-described out of service recovery algorithm(s) can stop scanning the access point using the particular frequency and select another frequency and another related scanning rate from scanning profile 250 to continue scanning access points.

As a more particular example, the herein-described out of service recovery algorithm(s) can determine to stop scanning access point 220 using frequency 230a and subsequently select a next frequency from scanning profile 250. In this example, the next frequency of set of frequencies 260 in scanning profile 250 is frequency 230b, and the herein-described out of service recovery algorithm(s) can attempt to scan frequency 230b at a corresponding scanning rate shown in set of scanning rates 262 of FIG. 2 as "Rate2". The herein-described out of service recovery algorithm(s) can continue scanning frequencies at corresponding scanning rates as set forth in scanning profile 250 until either (a) mobile computing device 210 connects to a network and/or is in service via a scanned frequency or (b) the herein-described out of service recovery algorithm(s) has scanned all of the frequencies of set of frequencies 260 in scanning profile 250 without successfully connecting mobile computing device 210 to a network and/or putting mobile computing device 210 into service.

The herein-described out of service recovery algorithm(s) can determine a scanning profile, such as scanning profile 250, based on a scanning context associated with a mobile computing device. The scanning context can have one or more attributes that can be utilized to determine the scanning profile, a set of frequencies, and/or a related set of scanning rates.

FIG. 3 depicts scanning context 300 for connecting a mobile computing device with one or more networks, in accordance with example embodiments. Scanning context 300 includes one or more attributes 310 that can take respective attribute values 312, where each attribute of attributes 310 can have a respective effect 314 on a scanning profile determined using scanning context 300. Attributes 310 can include a mobility attribute, a battery attribute, a screen activity attribute, a thermal attribute, a software application (or "app" for short) attribute, a most recently used (MRU) frequency attribute, a predicted location attribute, and an actual location attribute. In other examples, scanning context 300 can include more, fewer, and/or different attributes than attributes 310.

Some or all values of attributes 310 can be based on data associated with the mobile computing device, including sensor data. As examples:

- a value of the mobility attribute can be based on sensor data from a location sensor, a Global Positioning System (GPS) sensor, a motion sensor and/or an accelerometer;
- a value of the battery attribute can be based on sensor data from a battery sensor,
- a value of the screen activity attribute can be based on data indicating whether a screen associated with the mobile computing device;
- a value of the thermal attribute can be based on sensor data from a thermometer and/or another thermal sensor;
- a value of the software application attribute can be determined from operating system data about executing and/or ready to execute software applications of the mobile computing device;
- a value of the most recently used (MRU) frequency attribute can be determined by storing data about one or more frequencies used to connect the mobile computing device to a network and/or location data from a location sensor, a GPS sensor, a motion sensor and/or an accelerometer indicating one or more locations where the one or more frequencies were used to connect the mobile computing device to a network (e.g., a WWAN, a WLAN);
- a value of the predicted location attribute can be determined by a statistical analysis of location data of the mobile computing device over time, and a prediction of a location of the mobile computing device at a particular time based on the statistical analysis; and
- a value of the actual location attribute can be determined based on location data from a location sensor, a GPS sensor, a motion sensor and/or an accelerometer indicating one or more locations of the mobile computing device.

Other attributes can be determined based on other data associated with the mobile computing device, including, but not limited to, other sensor data obtained from the mobile computing device and/or from one or more other sources.

FIG. 3 shows that the mobility attribute of attributes 310 can have a value 312 selected from at least "[s]tatic, walking, driving" and can have an effect 314 on a scanning profile of "[i]ncreas[ing] scanning rate as mobility increases". A mobility attribute value of static can indicate that a mobile computing device is staying in one place or nearly staying in one place, such as not moving outside of a predetermined region (e.g., a region where part or all of a building such as a home or office is located, a fixed size circle, square, rectangle or other shape surrounding a location of the mobile computing device, where the shape represents the predetermined region). A mobility attribute value of walking can indicate that the mobile computing device is moving at a relatively slow rate, such as moving at a rate commonly associated with a walking person. Such rate of movement could be, for example, approximately 1 to 5 miles per hour or approximately 1 to 8 kilometers per hour. A mobility attribute value of driving can indicate that the mobile computing device is moving at a relatively fast rate, such as moving a rate commonly associated with a driving vehicle. Such rate of movement could be, for example, approximately 5-200 miles per hour, approximately 8 to 320 kilometers per hour, or a rate of movement that exceeds 10 miles per hour (or 18 kilometers per hour). In other examples, the mobility attribute can be represented using one or different values than the above-mentioned static/walking/driving value, such as a numerical speed value, a velocity vector value, combinations of speed, velocity, and/or acceleration values, or a qualitative value that has different categories than static/walking/driving.

Once the mobility attribute has been determined, the herein-described out of service recovery algorithm(s) can use the mobility attribute at least for determining scanning rates of a scanning profile; e.g., one or more of set of scanning rates 262 of scanning profile 250. In particular, the herein-described out of service recovery algorithm(s) can increase one or more scanning rates as the mobility attribute indicates that the mobile computing device is moving faster. As such, the one or more scanning rates can be positively correlated with the rate of movement of the mobile computing device as indicated by the mobility attribute. For example, a scanning rate can be relatively high when the mobility attribute indicates that a rate of movement of the mobile computing device is relatively high, such as when driving, and the scanning rate can be relatively low when the mobility attribute indicates that a rate of movement of the mobile computing device is relatively low, such as when static.

The herein-described out of service recovery algorithm(s) can increase scanning rates as the mobile computing device increases speed (and thereby moves faster) based on an observation that a probability that the frequencies and strengths of signals received by the mobile computing device will change can increase as the mobile computing device increases speed. For example, suppose that the mobility attribute has three categories as discussed above: static, walking, and driving. In this example, the herein-described out of service recovery algorithm(s) may determine respective scanning rates for a particular frequency F1 of the set of frequencies of the scanning profile as: X, X+d1, and X+d2. For this example, X is a baseline scanning rate for F1 associated with a mobile computing device, where the baseline scanning rate is associated with a static mobility attribute value, and where X>0.

Continuing this example, the value X+d1 is a scanning rate for F1 associated with a mobile computing device whose mobility attribute value is walking, where X is as previously described for this example, and where d1>0. As such, X+d1 is greater than X. Further continuing this example, the value X+d2 is a scanning rate for F1 associated with a mobile computing device, whose mobility attribute value is driving, where X is as previously described for this example, and where d2>d1. As such, X+d2 is greater than X. Then, the baseline scanning rate of X, which is the scanning rate associated with the static mobility attribute value, is less than the scanning rate of X+d1, which is the scanning rate associated with the walking mobility attribute value, and X+d1 is less than X+d2, which is the scanning rate associated with the driving mobility attribute value. Other techniques for determining scanning rates based on the mobility attribute are possible as well.

FIG. 3 shows that the battery attribute of attributes 310 can have a value 312 representing "Battery life %" and can have an effect 314 on a scanning profile of "[i]ncreas[ing] scanning rate as battery life increases". The battery life percentage value of the battery attribute can increase as a battery of the mobile computing device has more power. In some examples, the battery attribute can use different values than battery life percentage, such as but not limited to, battery power values, qualitative battery values (e.g., high battery power, low battery power), battery usage values, and/or values related to time since last battery charge.

Once the battery attribute has been determined, the herein-described out of service recovery algorithm(s) can use the battery attribute at least for determining scanning rates of a scanning profile; e.g., one or more of set of scanning rates 262 of scanning profile 250. In particular, the herein-described out of service recovery algorithm(s) can increase one or more scanning rates as the battery attribute indicates that the mobile computing device has increasingly longer battery life. The herein-described out of service recovery algorithm(s) can increase scanning rates as the mobile computing device has longer battery life based on an observation that the mobile computing device can scan more frequently and/or for longer periods of time when the mobile computing device has longer battery life and/or more battery power. As such, one or more scanning rates can be positively correlated with battery power of the mobile computing device as indicated by the battery attribute. For example, a scanning rate can be relatively high when the battery attribute indicates that battery power of the mobile computing device is relatively high, such as when the battery life percentage value is above 50% or between 90-100%, and the scanning rate can be relatively low when the battery attribute indicates that battery power of the mobile computing device is relatively low, such as when the battery life percentage value is below 50% or between 0-10%.

For example, suppose that a value of the battery attribute ranges from 0 to 100, indicating a percentage of battery life of one or more batteries of the mobile computing device. In that case, the herein-described out of service recovery algorithm(s) can determine respective scanning rates for a particular frequency F1 of the set of frequencies of the scanning profile as $X*[(BA-c1)/c2]$, where X is a baseline scanning rate for F1 associated with a mobile computing device, X>0, where BA is a value of the battery attribute, and where $c1$ and $c2$ are predetermined values with $100>c1$, $c2 \geq 0$, and where $c1+c2<100$. The $c1$ and $c2$ values can be pre-determined constant values, where $c1$ represents a minimum battery life to perform a scan and $c2$ represents a scaling value to convert battery life to a scan multiplier used to multiply a baseline scanning rate of X. If the scan multiplier; that is the value of $[(BA-c1)/c2]$ is negative or zero, then the scanning rate can be determined to be zero and no scanning can be performed. Note that the scan multiplier will be zero or negative if $BA \leq c1$, will be between zero and one if $c1 < BA \leq (c1+c2)$, will be between one and two if $(c1+c2) < BA \leq (c1+2*c2)$, and so on. Since BA is in the range of 0 to 100, the maximum scan multiplier value is $(100-c1)/c2$. Other techniques for determining a scanning rate based on a battery attribute value are possible as well.

FIG. 3 shows that the screen activity attribute of attributes 310 can have a value 312 selected from at least "[a]ctive, inactive" and can have an effect 314 on a scanning profile of "[i]f screen is active, increas[ing] scanning rate". In some examples, the screen activity attribute can use different values than a qualitative value of either "active" or "inactive." For instance, the screen activity attribute value can be based on a screen brightness level (perhaps where a brightness level of zero or another predetermined value indicates a screen associated with the mobile computing device is not active) and/or a screen activity timer indicating how long the screen associated with the mobile computing device has (or has not) been active.

Once the screen activity attribute has been determined for one or more screens associated with the mobile computing device, the herein-described out of service recovery algorithm(s) can use the screen activity attribute at least for determining scanning rates of a scanning profile; e.g., one or more of set of scanning rates 262 of scanning profile 250. In particular, the herein-described out of service recovery algorithm(s) can increase one or more scanning rates as the screen activity attribute indicates that at least one screen associated with the mobile computing device is active. The herein-described out of service recovery algorithm(s) can increase scanning rates as the screen activity attribute increases based on an observation that the mobile computing device is actively being utilized when at least one screen associated with the mobile computing device is active. Beneficially, when the user is actively utilizing the mobile computing device, the user may have more concern if the mobile computing device is out of service, and so the scanning rate can responsively increase.

For example, suppose that a value of the screen activity attribute is either 0 or 1, where 0 corresponds to an inactive value of the screen activity attribute is indicating a screen associated with the mobile computing device is not active, and where 1 corresponds to an active value indicating the screen associated with the mobile computing device is active. In examples where multiple screens are associated with the mobile computing device, SA can be set to 1 if at least one screen of the multiple screens is active, and SA can be set to 0 if no screen of the multiple screens is active.

Then, the herein-described out of service recovery algorithm(s) can determine respective scanning rates for a particular frequency F1 of the set of frequencies of the scanning profile as $X*(1+c_3*SA)$, where X is a baseline scanning rate for frequency F1, $X>0$, where SA is a value of the battery attribute (SA equaling either 0 or 1 as discussed above) and where $c_3$ is a predetermined value, $c_3 \geq 0$. In this example, if SA=0, such as when the screen of the mobile computing device is inactive, then $(1+c_3*SA)=(1+0)=1$, and so the respective scanning rate X for frequency F1 when SA=0 would be X. Continuing this example, if SA=1, such as when the screen of the mobile computing device is active, then $(1+c_3*SA)=1+c_3$, and so the respective scanning rate X for frequency F1 when SA=1 would be $X*(1+c_3)$. Since $c_3>0$, the respective scanning rate X for frequency F1 when SA=1 would be greater than when SA=0. As such, a particular scanning rate of the set of scanning rates can be relatively high when the screen attribute indicates that screen associated with the mobile computing device is active, such as when SA=1 in the example above. As well, the particular scanning rate can be relatively low when the screen attribute indicates that the screen associated with the mobile computing device is not active, such as when SA=0 in the example above. Other techniques for determining a scanning rate based on a screen activity attribute are possible as well.

FIG. 3 shows that the thermal attribute of attributes 310 can have a value 312 representing "[d]evice temperature in ° C. (or ° F.)"; that is, a temperature of the mobile computing device, and can have an effect 314 on a scanning profile of "[d]ecreas[ing] scanning rate as thermal attribute increases". The value of the thermal attribute can increase as a temperature of part or all of the mobile computing device and/or a temperature of an environment around the mobile computing device increases. In some examples, the thermal attribute can use different values than temperature values of part or all of the mobile computing device, such as but not limited to, temperature values of an environment around the mobile computing device, and/or a qualitative temperature measurement (e.g., relatively hot, relatively cold, average temperature).

Once the thermal attribute has been determined, the herein-described out of service recovery algorithm(s) can use the thermal attribute at least for determining scanning rates of a scanning profile; e.g., one or more of set of scanning rates 262 of scanning profile 250. In particular, the herein-described out of service recovery algorithm(s) can decrease one or more scanning rates as the thermal attribute indicates that the mobile computing device has a higher temperature. The herein-described out of service recovery algorithm(s) can decrease scanning rates as the mobile computing device has a higher temperature based on an observation that the mobile computing device will use power and thereby increase device temperature, if the mobile computing device scans more frequently and/or for longer periods of time. As such, one or more scanning rates can be negatively correlated with temperature of the mobile computing device as indicated by the thermal attribute. For example, a scanning rate can be relatively high when the thermal attribute indicates that temperature of the mobile computing device is relatively low and the scanning rate can be relatively low when the thermal attribute indicates that temperature of the mobile computing device is relatively high.

For example, suppose that a value of the thermal attribute ranges from a lowest possible temperature of T1 to a highest possible temperature of T2, indicating a temperature of the mobile computing device. In that case, the herein-described out of service recovery algorithm(s) can determine respective scanning rates for a particular frequency F1 of the set of frequencies of the scanning profile as $X*\{1+[c_4*(T2-TA)]\}$, where X is a baseline scanning rate for frequency F1, $X>0$, where TA is a value of the thermal attribute with $T1 \leq TA \leq T2$, and where $c_4$ is a predetermined value, $c_4>0$. Then, as TA increases, (T2−TA) will decrease and eventually reach 0 when TA=T2. Because $c_4>0$, the value $1+[c_4*(T2-TA)]$ will be greater than 1 when TA<T2, and the value will be equal to 1 when TA=T2. As a result, the scanning rate will increase as the value of the thermal attribute decreases. Other techniques for determining a scanning rate based on a thermal attribute value are possible as well.

FIG. 3 shows that the software application attribute of attributes 310 can have a value 312 representing a "[n]umber of active applications" and can have an effect 314 on a scanning profile of "increas[ing] scanning rate" when "one or more applications [are] active". The value of the software application attribute can increase as the mobile computing device executes more software applications. In some examples, the software application attribute can use different values than a number of active software applications, such as but not limited to, an average number of software applications that have been active during a period of time, a number of software applications that have been launched during a period of time, and/or a number of software applications that have received user input during a period of time.

Once the software application attribute has been determined, the herein-described out of service recovery algorithm(s) can use the software application attribute at least for determining scanning rates of a scanning profile; e.g., one or more of set of scanning rates 262 of scanning profile 250. In particular, the herein-described out of service recovery algorithm(s) can increase one or more scanning rates as the software application attribute increases.

The herein-described out of service recovery algorithm(s) can increase scanning rates as the software application attribute increases based on an observation that the mobile computing device is being actively utilized by a user if at least one software application is active. Because the user is actively utilizing the mobile computing device, the user may be paying more attention to the mobile computing device being out of service, and so the scanning rate can responsively increase. For example, suppose that a value of the software application attribute is an integer value specifying a number of active applications that ranges from 0 to APPMAX, where a value of 0 indicates that no software applications are active and where APPMAX is a value that indicates a maximum number of active applications. In that case, the herein-described out of service recovery algorithm(s) can determine respective scanning rates for a particular frequency F1 of the set of frequencies of the scanning profile as $X*[SAA*c_5+c_6]$, where X is a baseline scanning rate for frequency F1, $X>0$, where SAA is a value of the software application attribute, and where each of $c_5$ and $c_6$ is a predetermined value, $c_5>0$, $c_6 \geq 0$. By multiplying SAA by a positive value $c_5$, the scanning rate will increase as the number of active applications (as represented by SAA) increases. The addition of $c_6$ allows for a positive scanning rate even if SAA equals 0.

As such, one or more scanning rates can be positively correlated with a number of active software applications of the mobile computing device as indicated by the software application attribute. For example, a scanning rate can be relatively high when the software application attribute indicates that a number of active software applications of the mobile computing device is relatively high, such as greater than 1 or greater than 80% of APPMAX, and the scanning rate can be relatively low when the software application attribute indicates that a number of active software applications of the mobile computing device is relatively low, such as less than or equal to 1 or less than 20% of APPMAX.

In another example, the herein-described out of service recovery algorithm(s) can determine respective scanning rates for a particular frequency F1 of the set of frequencies of the scanning profile as $X*[(SAA>0)? c_7:c_8]$, where X is a baseline scanning rate for frequency F1, $X>0$, where SAA is a value of the software application attribute, and where each of $c_7$ and $c_8$ is a predetermined value, $c_7>0$, $c_8 \geq 0$. In this example, the operation $(SAA>0)? c_7:c_8$ involves first determining a binary value of a conditional "(SAA>0)", and then the operation returns the value of $c_7$ if the binary value of the conditional is true or the operation returns the value of $c_8$ if the binary value of the conditional is false. Such an operation would return $c_7$ if the software application attribute indicates at least one application were active on the mobile computing device, or would otherwise return $c_8$. Other techniques for determining a scanning rate based on a software application attribute value are possible as well.

FIG. 3 shows that the most recently used frequency attribute of attributes 310 can have a value 312 representing "MRU frequency value(s)" and can have an effect 314 on a scanning profile of "[s]elect[ing] most recently used (MRU) frequency first and/or [c]hang[ing] MRU frequency's scan rate". The value of the most recently used frequency attribute can be a frequency value for a most-recently-used or, more generally, previous frequency used to provide a particular service and/or to connect to a particular network, access point, and/or one or more other network entities. In some examples, the most recently used frequency attribute can list one frequency used to provide the particular service and/or to connect to the particular network, access point and/or one or more other network entities. In other examples, the most recently used frequency attribute can list multiple frequencies previously used to provide the particular service and/or to connect to the particular network, access point and/or one or more other network entities. For instance, the most recently used frequency attribute can list the most recently used NUM_FREQ frequencies, where NUM_FREQ can be an integer greater than 1.

Once the most recently used frequency attribute has been determined, the herein-described out of service recovery algorithm(s) can use the most recently used frequency attribute at least for determining a set of frequencies to scan for service and/or for determining one or more related scan rates. The herein-described out of service recovery algorithm(s) can attempt to use most recently used and/or previously used frequencies first based on an observation that a most recently used frequency has worked in the past to connect to an access point, network, and/or other network entity. Thus, a frequency that worked in the past can be tried first during a later attempt to connect to that access point, network, and/or other network entity.

For example, suppose that the most recently used frequency attribute lists NUM_FREQ1 most recently used frequencies to connect to an access point AP1 of network NET1, where NUM_FREQ1>0. In that case, the herein-described out of service recovery algorithm(s) can add the NUM_FREQ1 most recently used frequencies to a set of frequencies used to scan for possible connections to access point AP1 and/or network NET1. More specifically, suppose that NUM_FREQ1=3 and that there are ten possible frequencies that the mobile computing device can scan for possible connections to access point AP1. The herein-described out of service recovery algorithm(s) can generate a set of ten possible frequencies for possible connections to access point AP1, where the first NUM_FREQ1=3 frequencies in the set of ten could be the three frequencies of the most recently used frequency attribute and the remaining seven possible frequencies can be listed after the three frequencies of the most recently used frequency attribute; i.e., the three frequencies of the most recently used frequency attribute can precede the remaining seven possible frequencies in the set of ten possible frequencies. If the herein-described out of service recovery algorithm(s) use this set of ten frequencies to scan access point AP1, the first three frequencies scanned will be the three frequencies of the most recently used frequency attribute, and the last seven frequencies scanned will be the remaining possible frequencies.

Also, a scan rate for a most recently used and/or previously used frequency can be changed from, and thereby differ from, a scan rate for a non-most-recently-used and/or non-previously-used frequency. For example, the scan rate for a most recently used and/or previously used frequency can be associated with a value of SR_MRU and a scan rate for a corresponding non-most-recently-used and/or non-previously-used frequency can be associated with a value SR_NONMRU, where SR_MRU≠SR_NONMRU. Then, X, discussed above as the value of the baseline scanning rate for frequency F1, can be initialized to the SR_MRU value if F1 is a most recently used and/or previously used frequency, and X can be initialized to the SR_NONMRU value if F1 is a most recently used and/or previously used frequency. In some examples, SR_MRU>SR_NONMRU to indicate a higher scan rate for most recently used and/or previously used frequencies than the scan rate for non-most-recently-used and/or non-previously-used frequencies. Other techniques for setting a scan rate for a most recently used and/or previously used frequency to be different from a scan rate for a non-most-recently-used and/or non-previously-used frequency are possible as well. And other techniques for determining and/or utilizing a most recently used frequency attribute are possible as well.

FIG. 3 shows that the predicted location attribute of attributes 310 can have a value 312 representing "Mat/long. of predicted location(s)", which is short for latitude and longitude values of one or more predicted locations of the mobile computing device and/or a user of the mobile computing device, and can have an effect 314 on a scanning profile of "[s]elect[ing] frequencies based on actual MCD location". A predicted location can be a location that the mobile computing device and/or a user of the mobile computing device is expected to visit. In some examples, the predicted location attribute can include one predicted location. In other examples, the predicted location attribute can include more than one predicted location.

A predicted location can be determined using a statistical analysis of location data of the mobile computing device over time, and a prediction of a location of the mobile computing device at a particular time can be based on the statistical analysis. As indicated above, a predicted location can be specified using latitude and longitude values. In other examples, a predicted location could be specified using coordinates specified by a particular map, using a mailing address, using a postal code, and/or specified in some other manner.

Once the predicted location attribute has been determined, the herein-described out of service recovery algorithm(s) can use the predicted location attribute at least for determining a set of frequencies to scan for service. The herein-described out of service recovery algorithm(s) can use the predicted location(s) specified in the predicted location attribute to determine one or more access points, networks, and/or other network entities that can provide service at the predicted location(s), and include the frequencies (and related scanning rates) for the access points, networks, and/or other network entities that can provide service at the predicted location(s).

For example, suppose that the predicted location attribute indicates that the mobile computing device is predicted to be a location L1 where two access points APL1A and APL1B can provide service to the mobile computing device. In this example, the herein-described out of service recovery algorithm(s) can determine that the mobile computing device is likely to be at location L1 using the predicted location attribute, determine that access points APL1A and APL1B provide service at location L1, and add subsets of frequencies F_APL1A and F_APL1B to a set of frequencies of a profile, where respective subsets of frequencies F_APL1A and F_APL1B can be used to connect to respective access points APL1A and APL1B at location L1 to provide service to the mobile computing device. Other techniques for determining and/or utilizing a predicted location attribute are possible as well.

FIG. 3 shows that the actual location attribute of attributes 310 can have a value 312 representing "lat./long. of actual location", which is short for latitude and longitude values of one or more actual locations of the mobile computing device and/or a user of the mobile computing device, and can have an effect 314 on a scanning profile of "[s]elect[ing] frequencies based on predicted MCD location". An actual location can be a location that the mobile computing device and/or a user of the mobile computing device has (recently) visited In some examples, the actual location attribute can list one actual location In other examples, the actual location attribute can list more than one actual location.

An actual location can be determined by using one or more sensors, such as a location sensor and/or GPS device, to provide location data indicating the actual location of the mobile computing device and/or a user of the mobile computing device. As indicated above, an actual location can be specified using latitude and longitude values. In other examples, an actual location could be specified using coordinates specified by a particular map, using a mailing address, using a postal code, and/or specified in some other manner.

Once the actual location attribute has been determined, the herein-described out of service recovery algorithm(s) can use the actual location attribute at least for determining a set of frequencies to scan for service. The herein-described out of service recovery algorithm(s) can use the actual location(s) specified in the predicted location attribute to determine one or more access points, networks, and/or other network entities that can provide service at the actual location(s), and then include frequencies (and related scanning rates) for the access points, networks, and/or other network entities that can provide service at the actual location(s).

For example, the herein-described out of service recovery algorithm(s) can add subsets of frequencies (and related scanning rates) for the access points, networks, and/or other network entities that can provide service at the actual location(s) using similar techniques for actual locations as was discussed above for predicted location(s) in the context of the predicted location attribute. Other techniques for determining and/or utilizing an actual location attribute are possible as well.

The herein-described out of service recovery algorithm(s) can determine values of some or all of attributes 310 of scanning context 300 as discussed above. The herein-described out of service recovery algorithm(s) can use the values of attributes 310 to determine sets of frequencies and related scanning rates as disclosed above and then mathematically and/or otherwise combine the effects of attributes 310 to obtain a set of frequencies and a related set of scanning rates. Then, the herein-described out of service recovery algorithm(s) can generate and/or otherwise determine a scanning profile, such as scanning profile 250, using the obtained set of frequencies and the related set of scanning rates. Other techniques to determine scanning profiles from attributes of a scanning context are possible as well.

Figure 4:
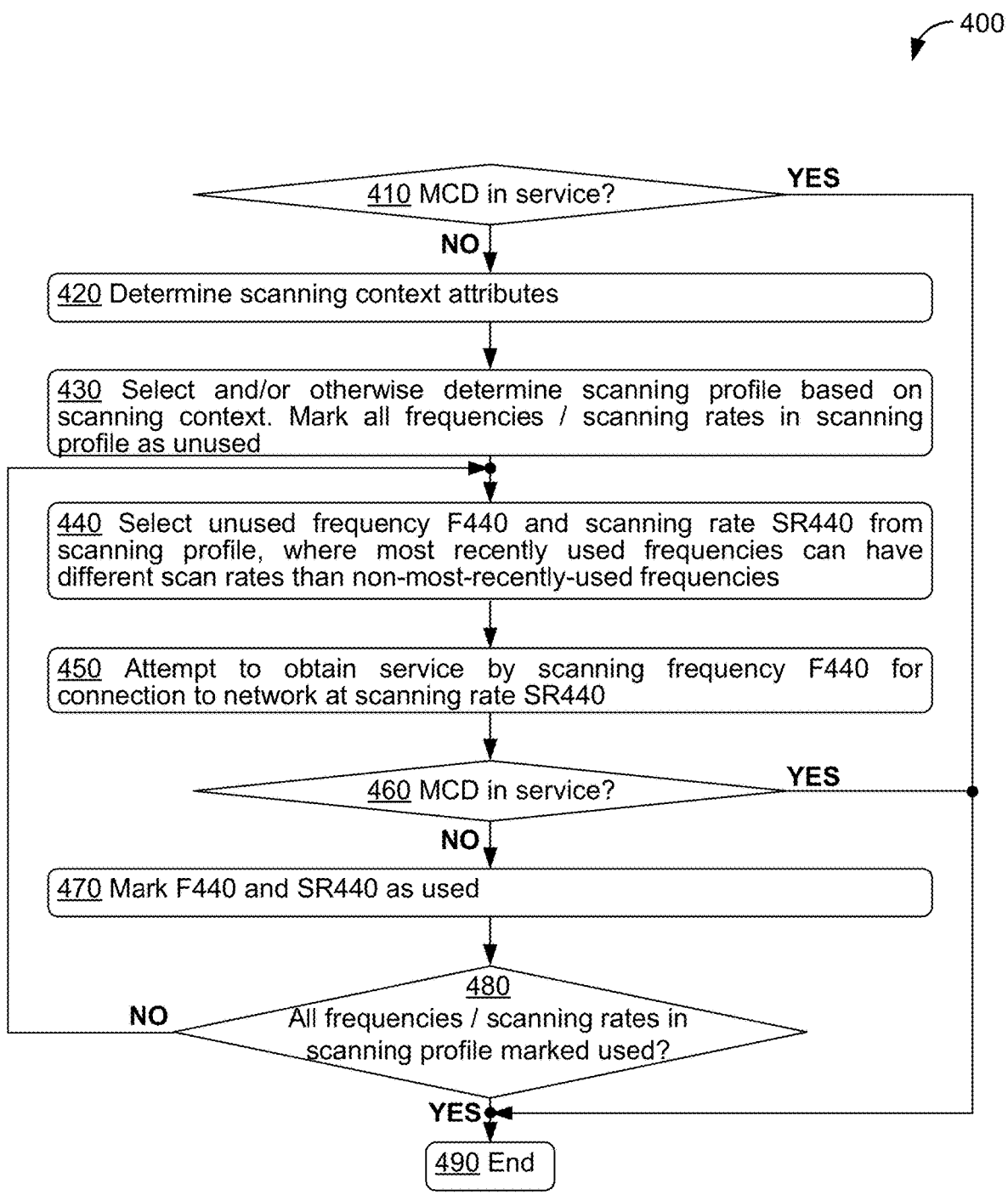
FIG. 4 is a flowchart of a method, in accordance with example embodiments.

FIG. 4 is a flowchart of method 400, in accordance with example embodiments. Method 400 can be carried out by a mobile computing device, such as, but not limited to, one or more of mobile computing devices 130, 132, 134, 136, 138, 210 and/or by a computing device, such as computing device 600, acting as a mobile computing device. Method 400 can be used by the mobile computing device as at least part of the herein-described out of service recovery algorithm(s) to obtain service for the (possibly out of service) mobile computing device.

Method 400 can begin at block 410, where the mobile computing device can determine whether the mobile computing device is in service. The mobile computing device can determine whether the mobile computing device is in service by determining whether the mobile computing device is connected to one or more networks and/or has access to one or more services; e.g., voice service, data service. If the mobile computing device determines that the mobile computing device is in service, then the mobile computing device can proceed to block 490. Otherwise, the mobile computing device can determine that the mobile computing device is out of service and can proceed to block 420.

At block 420, the mobile computing device can determine one or more attributes of a scanning context. Determining attributes of a scanning context is discussed above at least in the context of FIG. 3.

At block 430, the mobile computing device can select and/or otherwise determine a scanning profile based on the scanning context. Also, the mobile computing device can mark all frequencies and related scanning rates in the scanning context as unused. FIGS. 2 and 3 describe techniques for determining a scanning profile based on the values of attributes of the scanning context. For an example related to scanning context 300, the mobile computing device can determine the set of frequencies of the scanning context using values of the most recently used frequency, predicted location, and/or actual location attribute values and can determine related scanning rates using values of the mobility, battery, screen activity, thermal, and application activity attributes.

Another technique related to selecting a scanning profile would be to maintain a scanning profile database or similar data structure of scanning profiles. Then, once values of the attributes of the scanning context are determined at block 420, a query can be formulated using the values of the attributes of the scanning context. The query can then be provided to the scanning profile database. The scanning profile database can use the values of the attributes of the scanning context in the query to search the database and return one or more scanning profiles that best match the values of the attributes of the scanning context as specified in the query. Then, the mobile computing device can select a scanning profile from the returned scanning profile(s) as the scanning profile. In some examples, the mobile computing device can include the scanning profile database, thereby allowing selection of a scanning profile when the mobile computing device is unable to connect to any other devices that could provide remote access to the scanning profile database. In other examples, the mobile computing device can attempt remote access to the scanning profile database, and if unsuccessful, use another technique (such as described earlier in the context of this block of method 400) to determine the scanning profile.

At block 440, the mobile computing device can select an unused frequency F440 and a related scanning rate SR440 from the scanning profile, such as discussed above at least in the context of FIG. 3. In some examples, most recently used frequencies can have different scan rates compared to non-most-recently-used frequencies of the scanning profile. For example, at block 430, when the scanning profile is determined, a scan rate associated with a most recently used frequency can differ from a scan rate from a non-most-recently-used frequency, such as discussed above at least in the context of the most recently used frequency attribute of scanning context 300 and FIG. 3.

At block 450, the mobile computing device can attempt to obtain service by scanning frequency F440 for connection to a network (e.g., a WWAN or a WLAN) at scanning rate SR440. In attempting to obtain service, the mobile computing device can scan frequency F440 at scanning rate SR440 for a predetermined period of time and/or a predetermined number of attempts. For example, the mobile computing device can determine a period of time PT450 to scan frequency F440 and then attempt to obtain service using frequency F440 at scanning rate SR440 for no longer than the period of time PT450. As another example, the mobile computing device can determine a number of attempts NA450 to scan frequency F440 and then make no more than NA450 attempts to obtain service using frequency F440 at scanning rate SR440. Other techniques to attempt to obtain service by scanning frequency F440 for connection to a network at scanning rate SR440 are possible as well.

At block 460, the mobile computing device can determine whether the mobile computing device is in service. In some examples, the mobile computing device can determine whether the mobile computing device is in service after each attempt to obtain service using frequency F440 at scanning rate SR440 made in block 450. In other examples, the mobile computing device can determine whether the mobile computing device is in service after all attempts to obtain service using frequency F440 at scanning rate SR440 made in block 450 have been completed.

If the mobile computing device determines that the mobile computing device is in service, then the mobile computing device can proceed to block 490. Otherwise, the mobile computing device can determine that the mobile computing device is out of service and can proceed to block 470.

At block 470, the mobile computing device can mark frequency F440 and scanning rate SR440 as used.

At block 480, the mobile computing device can determine whether all of the frequencies and related scanning rates in the scanning profile have been marked as used. If the mobile computing device determines that all of the frequencies and related scanning rates in the scanning profile have been marked as used, then the mobile computing device will have attempted to obtain service by attempting to connect using all of the frequencies in the scanning profile, but will not have obtained service. In this case, the mobile computing device can proceed to block 490 without obtaining service for the mobile computing device. Otherwise, the mobile computing device can proceed to block 440.

At block 490, the mobile computing device can complete the procedures of method 400; i.e., method 400 can end. In related methods, instead of ending at block 490, the mobile computing device can wait and/or sleep for a period of time and then try again to obtain service by proceeding to block 410. In other related methods, instead of ending at block 490, the mobile computing device can wait for a particular event and then try again to obtain service by proceeding to block 410. The particular event can be, but is not limited to, a screen activation, receipt of a particular user input, a power-up event, and/or activation of a software application.

Example Data Network

Figure 5:
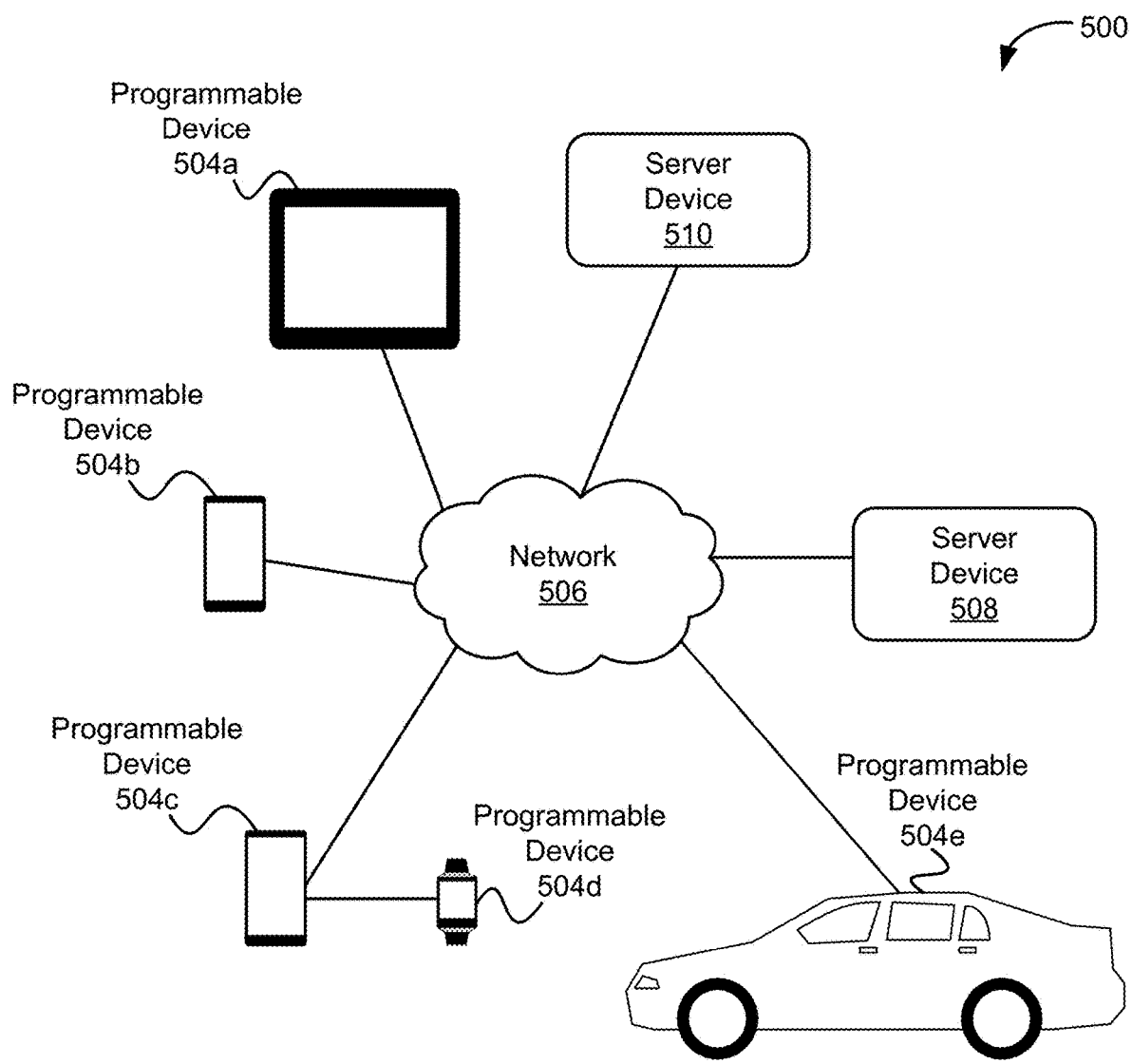
FIG. 5 depicts a distributed computing architecture, in accordance with example embodiments.

FIG. 5 depicts distributed computing architecture 500, in accordance with example embodiments. Distributed computing architecture 500 includes server devices 508, 510 that are configured to communicate, via network 506, with programmable devices 504*a*, 504*b*, 504*c*, 504*d*, 504*e*. Network 506 may correspond to a local area network (LAN), a wide area network (WAN), a WLAN, a WWAN, a corporate intranet, the public Internet, or any other type of network configured to provide a communications path between networked computing devices. Network 506 may also correspond to a combination of one or more LANs, WANs, corporate intranets, and/or the public Internet.

Although FIG. 5 only shows five programmable devices, distributed application architectures may serve tens, hundreds, or thousands of programmable devices. Moreover, programmable devices 504*a*, 504*b*, 504*c*, 504*d*, 504*e* (or any additional programmable devices) may be any sort of computing device, such as an ordinary laptop computer, desktop computer, wearable computing device, mobile computing device, head-mountable device (HMD), network terminal, wireless communication device (e.g., a smart phone or cell phone), and so on. In some examples, such as illustrated by programmable devices 504*a*, 504*b*, 504*c*, 504*e*, programmable devices can be directly connected to network 506. In other examples, such as illustrated by programmable device 504*d*, programmable devices can be indirectly connected to network 506 via an associated computing device, such as programmable device 504*c*. In this example, programmable device 504*c* can act as an associated computing device to pass electronic communications between programmable device 504*d* and network 506. In other examples, such as illustrated by programmable device 504*e*, a computing device can be part of and/or inside a vehicle, such as a car, a truck, a bus, a boat or ship, an airplane, etc. In other examples not shown in FIG. 5, a programmable device can be both directly and indirectly connected to network 506.

Server devices 508, 510 can be configured to perform one or more services, as requested by programmable devices 504a-504e. For example, server device 508 and/or 510 can provide content to programmable devices 504a-504e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 508 and/or 510 can provide programmable devices 504a-504e with access to software for database, search, computation, graphical, audio, video, World Wide Web/Internet utilization, and/or other functions. Many other examples of server devices are possible as well.

Computing Device Architecture

Figure 6:
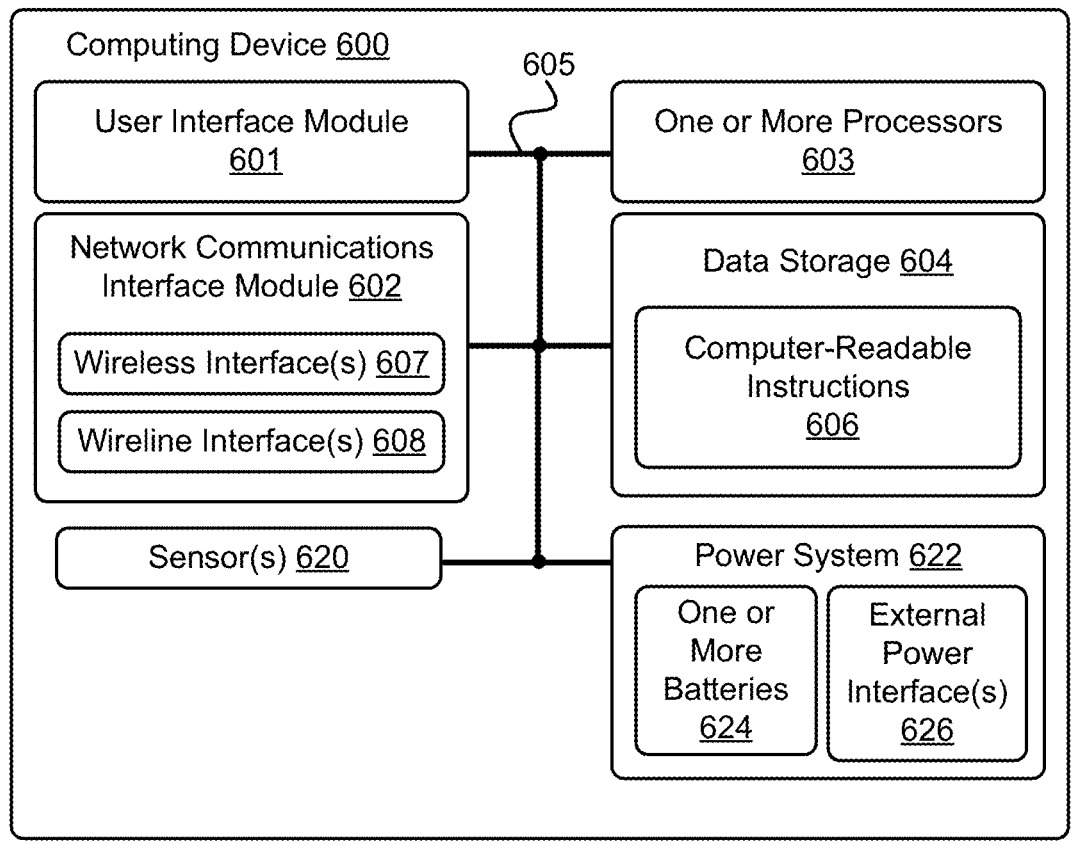
FIG. 6 is a functional block diagram of an example computing device, in accordance with example embodiments.

FIG. 6 is a functional block diagram of an example computing device 600, in accordance with example embodiments. In particular, computing device 600 shown in FIG. 6 can be configured to perform at least one function of the herein-described out of service recovery algorithm(s), an access point, a mobile computing device, access points 110, 112, 120, 122, 124, 220, 222, 224, mobile computing device 130, 132, 134, 136, 138, 210, scanning profile 250, scanning context 300, distributed computing architecture 500, and/or at least one function related to method 400 and/or method 700.

Computing device 600 may include a user interface module 601, a network communication interface module 602, one or more processors 603, data storage 604, one or more sensors 620, and power system 622, all of which may be linked together via a system bus, network, or other connection mechanism 605.

User interface module 601 can be operable to send data to and/or receive data from external user input/output devices. For example, user interface module 601 can be configured to send and/or receive data to and/or from user input devices such as a touch screen, a computer mouse, a keyboard, a keypad, a touch pad, a track ball, a joystick, a camera, a voice recognition module, and/or other similar devices. User interface module 601 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 601 can also be configured to generate audible outputs, such as a speaker, speaker jack, audio output port, audio output device, earphones, and/or other similar devices. User interface module 601 can further be configured with one or more haptic devices that can generate haptic outputs, such as vibrations and/or other outputs detectable by touch and/or physical contact with computing device 600. In some examples, user interface module 601 can be used to provide a graphical user interface (GUI) for utilizing computing device 600.

Network communications interface module 602 can include one or more wireless interfaces 607 and/or one or more wireline interfaces 608 that are configurable to communicate via a network. Wireless interface(s) 607 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interface(s) 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications interface module 602 can be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 603 can include one or more general purpose processors, and/or one or more special purpose processors (e.g., digital signal processors, graphics processing units, application specific integrated circuits, etc.). One or more processors 603 can be configured to execute computer-readable instructions 606 that are contained in data storage 604 and/or other instructions as described herein.

Data storage 604 can include one or more computer-readable storage media that can be read and/or accessed by at least one of one or more processors 603. The one or more computer-readable storage media can include volatile and/or non-volatile storage components, such as optical, magnetic, organic or other memory or disc storage, which can be integrated in whole or in part with at least one of one or more processors 603. In some examples, data storage 604 can be implemented using a single physical device (e.g., one optical, magnetic, organic or other memory or disc storage unit), while in other examples, data storage 604 can be implemented using two or more physical devices.

Data storage 604 can include computer-readable instructions 606 and perhaps additional data. In some examples, data storage 604 can additionally include storage required to perform at least part of the herein-described methods, scenarios, and techniques and/or at least part of the functionality of the herein-described devices and networks.

In some examples, computing device 600 can include one or more sensors 620. Sensors 620 can be configured to measure conditions within computing device 600 and/or conditions in an environment of computing device 600 and provide data about these conditions. For example, sensors 620 can include one or more of: (i) sensors for obtaining data about computing device 600, such as, but not limited to, a thermometer measuring computing device 600's temperature, a battery sensor for measuring power of one or more batteries of power system 622, and/or other sensors measuring conditions of computing device 600; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 600, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 600, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 600, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 620 are possible as well.

Power system 622 can include one or more batteries 624 and/or one or more external power interfaces 626 for providing electrical power to computing device 600. Each battery of the one or more batteries 624 can, when electrically coupled to the computing device 600, act as a source of stored electrical power for computing device 600. One or more batteries 624 of power system 622 can be configured to be portable; e.g., readily transportable by a person carrying computing device 600 with the one or more batteries. Some or all of one or more batteries 624 can be readily removable from computing device 600. In other examples, some or all of one or more batteries 624 can be internal to computing device 600, and so may not be readily removable from computing device 600. Some or all of one or more batteries 624 can be rechargeable; for example, a rechargeable battery can be recharged via a wired connection between the battery and another power supply; e.g., one or more power supplies that are external to computing device 600 that are connected to computing device 600 via the one or more external power interfaces. In other examples, some or all of one or more batteries 624 can be non-rechargeable batteries.

One or more external power interfaces 626 of power system 622 can include one or more wired-power interfaces, such as a USB cable and/or a power cord, that enable wired electrical power connections to one or more power supplies that are external to computing device 600. One or more external power interfaces 626 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 626, computing device 600 can draw electrical power from the external power source the established electrical power connection. In some examples, power system 622 can include related sensors; e.g., battery sensors associated with the one or more batteries, electrical power sensors.

Example Methods of Operation

FIG. 7 is a flowchart of method 700, in accordance with example embodiments. Method 700 can be executed by a mobile computing device, such as computing device 600. Method 700 can begin at block 710, where the mobile computing device can determine whether the mobile computing device is connected to a particular wireless network, such as discussed herein at least in the context of FIGS. 1, 2, and 4. In some examples, the particular wireless network can include a wireless wide area network, such as discussed herein at least in the context of FIG. 1.

At block 720, responsive to determining that the mobile computing device is not connected to the particular wireless network: a scanning context that includes at least one attribute associated with the mobile computing device can be determined by the mobile computing device, the at least one attribute including a mobility attribute; a set of frequencies associated with the particular wireless network and a set of scanning rates for scanning the set of frequencies based on the scanning context can be determined, where each frequency in the set of frequencies is associated with a respective scanning rate in the set of scanning rates; and one or more frequencies in the set of frequencies can be scanned at one or more associated scanning rates in the set of scanning rates for a signal that enables the mobile computing device to attempt connection with the particular wireless network, such as discussed herein at least in the context of FIGS. 2-4.

In some examples, determining the set of frequencies associated with the particular wireless network and the set of scanning rates for scanning the set of frequencies based on the scanning context can include: determining a plurality of frequencies associated with the wireless wide area network; determining a particular frequency of the plurality of frequencies associated with the wireless wide area network, where the particular frequency was previously used to connect the mobile computing device with the wireless wide area network; and determining the set of frequencies based on the particular frequency, such as discussed herein at least in the context of FIGS. 2-4.

In other examples, determining the set of frequencies associated with the particular wireless network and the set of scanning rates for scanning the set of frequencies based on the scanning context can include: determining a scanning profile based on at least one attribute associated with the scanning context, the scanning profile including information about the set of frequencies and information about the set of scanning rates; and determining the set of frequencies and the set of scanning rates based on the scanning profile, such as discussed herein at least in the context of FIGS. 2-4.

In other examples, one or more scanning rates of the set of scanning rates can be positively correlated with the rate of movement of the mobile computing device as indicated by the mobility attribute, such as discussed herein at least in the context of FIG. 3.

In other examples, the at least one attribute can further include a location attribute related to one or more locations associated with the mobile computing device, such as discussed herein at least in the context of FIG. 3. In some of these examples, determining the set of frequencies associated with the particular wireless network and the set of scanning rates for scanning the set of frequencies based on the scanning context can include: determining a predicted location of the mobile computing device based on the location attribute; determining a predicted set of frequencies based on the predicted location; and adding at least one frequency from the predicted set of frequencies to the set of frequencies associated with the particular wireless network, such as discussed herein at least in the context of FIG. 3. In other of these examples, determining the predicted set of frequencies based on the predicted location can include determining a predicted-location frequency that was previously used to connect the mobile computing device with the particular wireless network at the predicted location and; adding at least one frequency from the predicted set of frequencies to the set of frequencies associated with the particular wireless network can include adding the predicted-location frequency to the set of frequencies associated with the particular wireless network, such as discussed herein at least in the context of FIG. 3. In still other of these examples, determining the set of frequencies associated with the particular wireless network and the set of scanning rates for scanning the set of frequencies based on the scanning context can include: determining a current location of the mobile computing device based on the location attribute; determining a current set of frequencies based on the current location of the mobile computing device; and adding at least one frequency from the current set of frequencies to the set of frequencies associated with the particular wireless network, such as discussed herein at least in the context of FIG. 3. In even other of these examples, determining the current set of frequencies based on the current location includes determining a current-location frequency that was previously used to connect the mobile computing device with the particular wireless network at the current location and; adding at least one frequency from the current set of frequencies to the set of frequencies associated with the particular wireless network can include adding the current-location frequency to the set of frequencies associated with the particular wireless network, such as discussed herein at least in the context of FIG. 3.

In other examples, the at least one attribute further includes a thermal attribute associated with a temperature of the mobile computing device, such as discussed herein at least in the context of FIG. 3. In some of these examples, one or more scanning rates of the set of scanning rates can be negatively correlated with the temperature of the mobile computing device as indicated by the thermal attribute, such as discussed herein at least in the context of FIG. 3.

In other examples, the at least one attribute further includes a screen attribute associated with a status of a screen associated with the mobile computing device, such as discussed herein at least in the context of FIG. 3. In some of these examples, a particular scanning rate of the set of scanning rates is relatively high when the screen attribute indicates that the screen associated with the mobile computing device is active, and where the particular scanning rate is relatively low when the screen attribute indicates that the screen associated with the mobile computing device is not active, such as discussed herein at least in the context of FIG. 3.

In other examples, the at least one attribute further comprises a most recently used frequency attribute associated with a most recently used frequency that has most recently used to connect to the particular wireless network, such as discussed herein at least in the context of FIGS. 3 and 4. In some of these examples, determining the set of frequencies associated with the particular wireless network and the set of scanning rates for scanning the set of frequencies based on the scanning context includes: generating the set of frequencies associated with the particular wireless network with the most recently used frequency preceding other frequencies in the set of frequencies; and generating the set of scanning rates for scanning the set of frequencies so that a scanning rate associated with the most recently used frequency is higher than other scanning rates associated with other frequencies in the set of frequencies, such as discussed herein at least in the context of FIGS. 3 and 4.

In other examples, the mobility attribute can be related to a rate of movement of the mobile computing device, such as discussed herein at least in the context of FIG. 3.

In some examples, method 700 can further include: attempting to connect the mobile computing device to the wireless wide area network using the particular frequency at a particular scanning rate associated with the particular frequency; and connecting the mobile computing device to the wireless wide area network using the particular frequency, such as discussed herein at least in the context of FIGS. 2-4.

In other examples, method 700 can further include: attempting to connect the mobile computing device to the wireless wide area network using the particular frequency at a particular scanning rate associated with the particular frequency; failing to connect the mobile computing device to the wireless wide area network using the particular frequency; and after failing to connect the mobile computing device to the wireless wide area network using the particular frequency: selecting a second particular frequency from the set of frequencies, determining a second scanning rate associated with the second particular frequency based on the set of scanning rates, and attempting to connect the mobile computing device to the wireless wide area network using the second particular frequency at the second scanning rate, such as discussed herein at least in the context of FIGS. 2-4. In some of these examples, method 700 can further include: connecting the mobile computing device to the wireless wide area network using the second particular frequency, such as discussed herein at least in the context of FIGS. 2-4.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

The invention claimed is:

1. A computer-implemented method, comprising:
responsive to determining that a mobile computing device is not connected to a particular wireless network,
determining, by the mobile computing device, a software application attribute representing a number of active applications associated with the mobile computing device;
determining a set of scanning rates for scanning a set of frequencies associated with the particular wireless network based on the software application attribute, wherein each frequency in the set of frequencies is associated with a respective scanning rate in the set of scanning rates; and
scanning one or more frequencies in the set of frequencies at one or more associated scanning rates in the set of scanning rates for a signal that enables the mobile computing device to attempt connection with the particular wireless network.

2. The computer-implemented method of claim 1, wherein the particular wireless network comprises a wireless wide area network.

3. The computer-implemented method of claim 2, further comprising:
determining a plurality of frequencies associated with the wireless wide area network;
determining a particular frequency of the plurality of frequencies associated with the wireless wide area network, wherein the particular frequency was previously used to connect the mobile computing device with the wireless wide area network; and
determining the set of frequencies based on the particular frequency.

4. The computer-implemented method of claim 3, further comprising:
attempting to connect the mobile computing device to the wireless wide area network using the particular frequency at a particular scanning rate associated with the particular frequency; and
connecting the mobile computing device to the wireless wide area network using the particular frequency.

5. The computer-implemented method of either claim 3, further comprising:
attempting to connect the mobile computing device to the wireless wide area network using the particular frequency at a particular scanning rate associated with the particular frequency; and
in response to failing to connect the mobile computing device to the wireless wide area network using the particular frequency:
selecting a second particular frequency from the set of frequencies;
determining a second scanning rate associated with the second particular frequency based on the set of scanning rates; and
attempting to connect the mobile computing device to the wireless wide area network using the second particular frequency at the second scanning rate.

6. The computer-implemented method of claim 5, further comprising:
connecting the mobile computing device to the wireless wide area network using the second particular frequency.

7. The computer-implemented method of claim 1, further comprising:
determining a scanning profile based the software application attribute, the scanning profile comprising information about the set of frequencies and information about the set of scanning rates; and
determining the set of frequencies and the set of scanning rates based on the scanning profile.

8. The computer-implemented method of claim 1, wherein one or more scanning rates of the set of scanning rates is positively correlated with a rate of movement of the mobile computing device.

9. The computer-implemented method claim 1, wherein the set of scanning rates for scanning the set of frequencies associated with the particular wireless network is further based on a location attribute related to one or more locations associated with the mobile computing device.

10. The computer-implemented method of claim 9, further comprising:
determining a predicted location of the mobile computing device based on the location attribute;
determining a predicted set of frequencies based on the predicted location; and
adding at least one frequency from the predicted set of frequencies to the set of frequencies associated with the particular wireless network.

11. The computer-implemented method of claim 10, wherein determining the predicted set of frequencies based on the predicted location comprises determining a predicted-location frequency that was previously used to connect the mobile computing device with the particular wireless network at the predicted location; and
wherein adding at least one frequency from the predicted set of frequencies to the set of frequencies associated with the particular wireless network comprises adding the predicted-location frequency to the set of frequencies associated with the particular wireless network.

12. The computer-implemented method of claim 9, further comprising:
  determining a current location of the mobile computing device based on the location attribute;
  determining a current set of frequencies based on the current location of the mobile computing device; and
  adding at least one frequency from the current set of frequencies to the set of frequencies associated with the particular wireless network.

13. The computer-implemented method of claim 12, wherein determining the current set of frequencies based on the current location comprises determining a current-location frequency that was previously used to connect the mobile computing device with the particular wireless network at the current location; and wherein adding at least one frequency from the current set of frequencies to the set of frequencies associated with the particular wireless network comprises adding the current-location frequency to the set of frequencies associated with the particular wireless network.

14. The computer-implemented method of claim 1, wherein the set of scanning rates for scanning the set of frequencies associated with the particular wireless network is further based on a thermal attribute associated with a temperature of the mobile computing device.

15. The computer-implemented method of claim 14, wherein one or more scanning rates of the set of scanning rates is negatively correlated with the temperature of the mobile computing device as indicated by the thermal attribute.

16. The computer-implemented method of claim 1, wherein the set of scanning rates for scanning the set of frequencies associated with the particular wireless network is further based on a screen attribute representing a status of a screen associated with the mobile computing device.

17. The computer-implemented method of claim 16, wherein a particular scanning rate of the set of scanning rates is relatively high when the screen attribute indicates that the screen associated with the mobile computing device is active, and wherein the particular scanning rate is relatively low when the screen attribute indicates that the screen associated with the mobile computing device is not active.

18. The computer-implemented method of claim 1, wherein the set of frequencies is based on a most recently used frequency attribute associated with a most recently used frequency that has most recently used to connect to the particular wireless network.

19. The computer-implemented method of claim 18, further comprising:
  generating the set of frequencies associated with the particular wireless network with the most recently used frequency preceding other frequencies in the set of frequencies; and
  generating the set of scanning rates for scanning the set of frequencies so that a scanning rate associated with the most recently used frequency is higher than other scanning rates associated with other frequencies in the set of frequencies.

20. The computer-implemented method of claim 1, further comprising:
  in response to a rate of movement of the mobile computing device increasing, increasing at least one scanning rate of the set of scanning rates.

21. A mobile computing device, comprising:
  one or more processors; and
  one or more computer readable media having computer-readable instructions stored thereon that, when executed by the one or more processors, cause the mobile computing device to carry out functions comprising the computer-implemented method of claim 1.

22. A mobile computing device comprising:
  means for carrying out the computer-implemented method of claim 1.

23. An article of manufacture comprising one or more non-transitory computer-readable media having computer-readable instructions stored thereon that, when executed by one or more processors of a mobile computing device, cause the mobile computing device to carry out functions that comprise the computer-implemented method of claim 1.

* * * * *